United States Patent [19]

Alten

[11] 4,325,155
[45] Apr. 20, 1982

[54] DOCK LEVELER

[76] Inventor: Kurt Alten, Ringstr. 14, 3015 Wennigsen, Fed. Rep. of Germany

[21] Appl. No.: 140,412

[22] Filed: Apr. 14, 1980

[30] Foreign Application Priority Data

Apr. 12, 1979 [DE] Fed. Rep. of Germany ....... 2914963

[51] Int. Cl.³ .............................................. E01D 1/00
[52] U.S. Cl. .................................................. 14/71.1
[58] Field of Search ...................... 14/71.1, 71.3, 69.5

[56] References Cited

U.S. PATENT DOCUMENTS

| | | | |
|---|---|---|---|
| 3,216,373 | 11/1965 | Boone | 14/71.1 X |
| 3,409,922 | 11/1968 | Beckwith | 14/71.3 |
| 3,500,486 | 3/1970 | Le Clear | 14/71.3 |
| 3,728,753 | 4/1973 | Beckwith | 14/71.3 |
| 3,921,241 | 11/1975 | Smith | 14/71.3 |
| 3,982,295 | 9/1976 | Burnham | 14/71.3 |
| 4,047,258 | 9/1977 | Burnham | 14/71.3 |

Primary Examiner—Nile C. Byers, Jr.

Attorney, Agent, or Firm—Becker & Becker, Inc.

[57] ABSTRACT

A dock leveler or transfer bridge for ramps, comprising a bridge plate pivotally journalled at its rear end about a horizontal axis on a ramp. The front end of the bridge plate has a foldable or pivotal extension pivoted downwardly in the rest position and, in the working or effective position, pivoted into the plane of the bridge plate. The extension serves for exclusive support of the bridge plate upon the vehicle which is to be loaded or unloaded. When the dock leveler is not being used, the bridge plate is supported upon a pendulum-like strut or support located at the front end thereof. This pendulum-like support, by means of a lever pivotal with the extension, holds or maintains a pivot position for introducing the bridge plate into a ramp recess. In this pivot position, the strut or support cannot correspond or align with its abutment. The strut has an extension prolongation located above its pivot shaft, with the lever engaging behind the prolongation by means of a pull rod pivotally connected to the lever.

19 Claims, 4 Drawing Figures

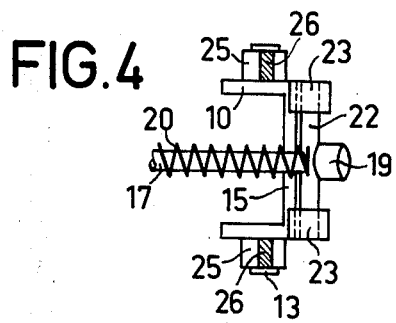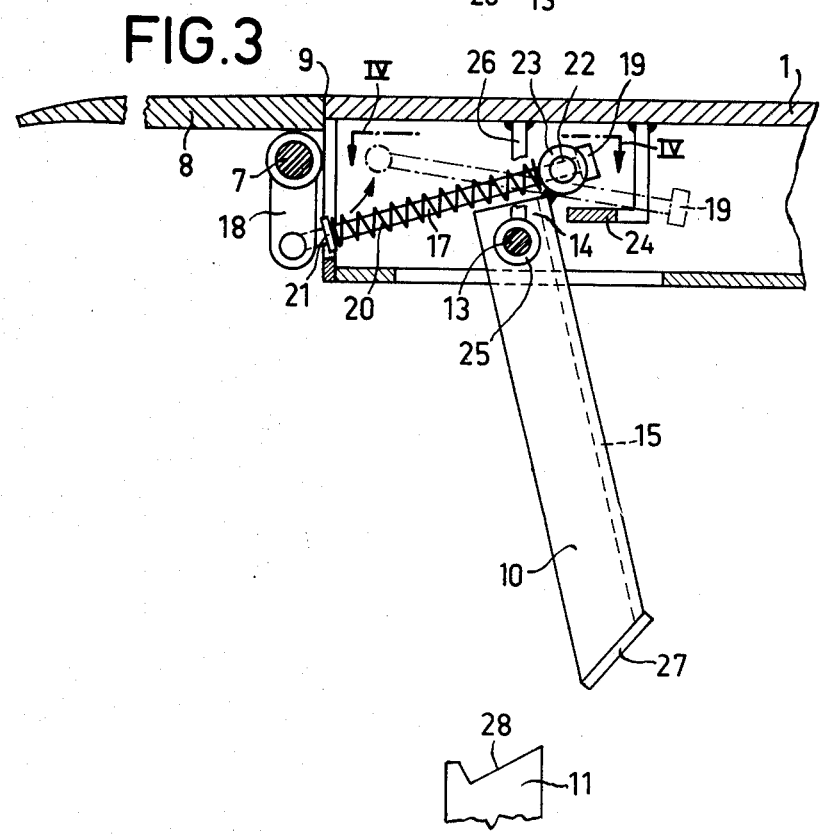

DOCK LEVELER

The present invention relates to a dock leveler or transfer bridge for ramps, and has a bridge plate pivotally journalled at its rear end about a horizontal axis on the ramp. The bridge plate, at its front end, has a foldable or pivotal extension which is pivoted downwardly in the rest position, and is pivoted into the plane of the bridge plate in the working position. The extension serves for exclusive support of the bridge plate upon the vehicle which is to be loaded or unloaded. When the dock leveler is not being used, the bridge plate is supported upon a pendulum-like strut or support located at its front end. This pendulum-like support holds or maintains a pivot position, for introducing the bridge plate into a ramp recess, by means of a lever pivotal with the extension; in this pivot position, the pendulum-like support cannot correspond with its abutment.

With previously known transfer bridges of this type of construction, the strut or support has a forwardly directed cam with an incline engaged by the lever of the extension when the extension is in the work position. When the extension is folded or pivoted downwardly, the lever, having a roller thereon, slides upon the incline; in the vertical position of the extension (rest position), there no longer exists any engagement between the lever and the incline. The support can pivot into the work or effective position under the influence of a spring. If the bridge plate is then lowered, it is secured by support upon the mentioned abutment. The ramp can now be traversed by larger vehicles without having to fear that the bridge plate will dip or plunge into the ramp. The mentioned connection between the lever of the extension and the pendulum-like support, however, has the disadvantage that the support can only reach a working or effective position after a large pivot path of the extension, which is determined by the cam and the incline. The roller of the lever rises from the incline only after a comparatively long path, and not until then is the strut or support released or made free for pivoting into a working or effective position.

The object of the present invention is to eliminate these drawbacks, and to increase the reaction speed of the strut or support during downward folding or pivoting of the extension.

This object, and other objects and advantages of the present invention, will appear more clearly from the following specification in connection with the accompanying drawings, in which:

FIG. 3 is a partial longitudinal section through a modified bridge similar to that in FIG. 2; and FIG. 4 is a partial section along line IV—IV in FIG. 3.

Figure 1:
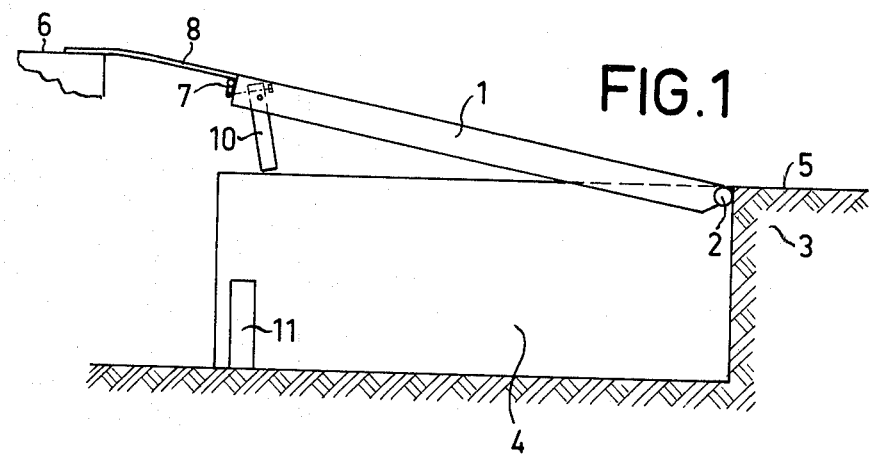
FIG. 1 shows a transfer bridge for ramps (a dock leveler) in the operating position.

The dock leveler of the present invention is characterized primarily in that the strut or support has an extension prolongation located above its pivot shaft, with the lever engaging behind this extension prolongation by means of a draw or pull rod pivotally connected to the lever. This pull rod holds the support, which is preferably embodied as a weight pendulum, in its rest position when the extension is unfolded, i.e., when it is in the operating position. This holding is possible because the pull rod engages behind the extension prolongation. If the extension is now folded downwardly, for instance after termination of the loading traffic on the ramp, the pull rod releases the support; the latter can then move into the generally vertical working or effective position chiefly due to its dead weight. As a result, there occurs a release of the strut or support by shifting of the pull rod in a direction toward the rear bridge end.

According to further features of the present invention, the pull rod passes through the strut or support, and is thickened or bulging at its rear end. The length of the extension prolongation relative to the length of the strut or support (figured from the free end up to the pivot shaft) has a ratio in a range approximately between 1:7 to 1:4. The pull rod, in the working or effective position of the extension, is located approximately at right angles to the strut or support 10. The length of the lever is approximately 40–50% of the pull rod length, and the pull rod length is approximately 60–80% of the length of the strut or support. In the rest position of the extension, the pull rod extends substantially parallel to the bridge plate. The strut or support may have a U-shaped configuration with a crosspiece interconnecting legs thereof and the pull rod passing through the crosspiece. The blocking or latching of the strut or support is releasable by a pivoting of the extension from the working or effective position downwardly by approximately 10°–15°. The strut or support may be a weight pendulum.

In a modified form of the present invention, the strut or support has a spring for pivoting it into the working or effective position. The spring 20 is preloaded, and is a compression spring which surrounds the pull rod. The extension prolongation is a traverse, bar or rod which extends transverse to the strut or support, with the pull rod passing therethrough. The extension prolongation (bushing or sleeve in this case), in the working or effective position of the strut or support, engages against an abutment rigidly connected with the bridge plate. The extension prolongation, in the rest position of the strut or support, is held between the spring and the bulge of the pull rod. The strut or support is profiled or shaped in such a way that during introduction of the bridge plate into the ramp recess in the rest position of the strut or support, the bridge plate does not encounter any hindrance from the recess abutment support. The traverse has a break-through (bore) corresponding to the diameter of the pull rod. The strut or support is supported on both sides, and the pull rod engages against the strut or support centrally between the supports.

Referring now to the drawings in detail, the generally box-like rigid bridge plate 1 is journalled at its rear end at 2 about a horizontal axis on the ramp or dock 3 or at the rear edge of a ramp recess 4 into which the bridge plate 1 can dip or be introduced when a transfer operation is to occur between the ramp upper side 5 and the platform 6 of a vehicle to be loaded or unloaded.

At the free end of the bridge plate 1, there is located an extension 8 which is pivotal about a horizontal axis 7 and by means of which the bridge can be exclusively supported upon the platform 6, during a loading operation, etc., in such a manner that the bridge can readily follow possible changes in height or level of the platform 6. In order that the bending forces which occur in this connection can be transferred, a stop or abutment 9 is provided between the extension 8 and the bridge plate 1.

Figure 2:
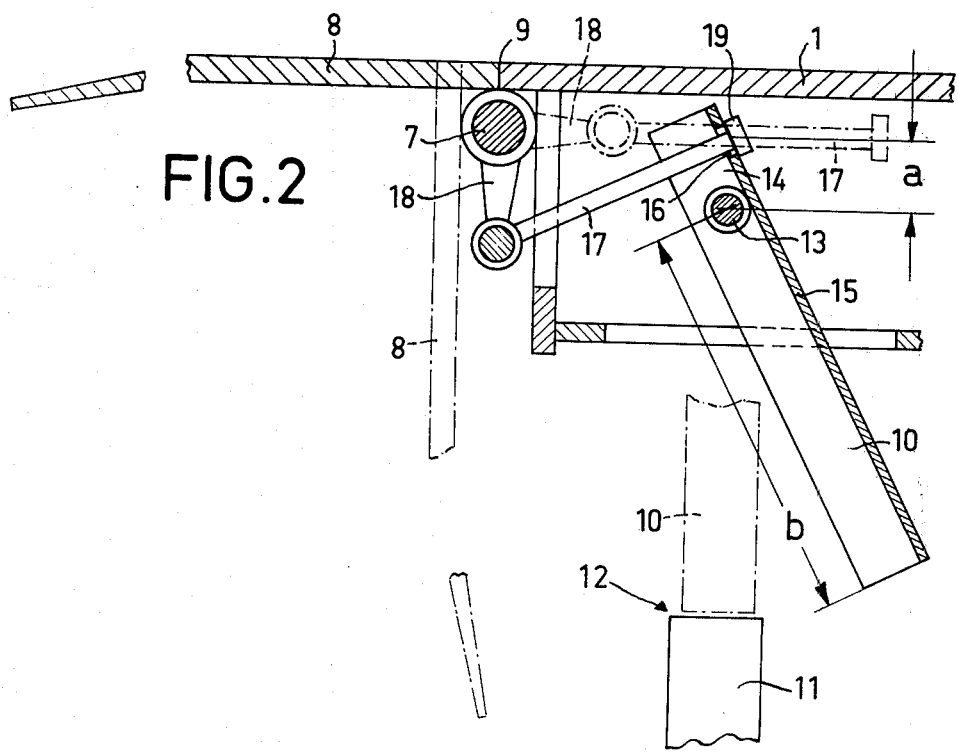
FIG. 2 shows a partial longitudinal section through the bridge of FIG. 1, but with a horizontally extending bridge plate.

In the rest position, the extension 8 is folded downwardly (dot-dash line). If the bridge collectively is not in operation and, under these circumstances, an unhindered traveling operation is to occur upon the ramp upper side 5, then the upper surface of the bridge plate 1 is flush with the ramp upper side 5, whereby, in the region of its front end, the bridge plate 1 is supported by a rigid strut or support 10 upon an abutment support 11 located in the ramp recess 4 (see FIG. 2 at 12).

The support or strut 10 is a weight pendulum with a shaft 13 which extends transverse to the bridge plate 1 and on which the possibly U-profiled support 10 is accordingly hung or suspended in a pendulum manner. The support 10 has an extension prolongation 14 located above the shaft 13, which is supported on the bridge plate 1. This extension prolongation 14 has a hole 16 in the crosspiece 15 of the U-shaped profile; a draw or pull rod 17 passes through the hole 16, with the front end thereof being pivotally connected with a lever 18. The pull rod 17 extends substantially in the longitudinal direction of the bridge plate 1, with its rear end being provided with a bulge or widened portion 19 in order to thus engage behind the crosspiece 15 and accordingly behind the support 10.

The lever 18 is rigidly connected with the extension 8. If the extension 8 is in the operating position, i.e. approximately horizontal, then the lever 18 is pointed approximately vertically downwardly; if the extension 8 is folded downwardly, then the horizontally extending lever 18 is directed rearwardly toward the ramp 3. (See the dot-dash line representation of the lever 18 in FIG. 2)

To put the bridge into operation with a downward folded extension 8, the bridge plate 1 is first pivoted into its upper final position; thereupon, the extension 8 is unfolded. These procedures can occur either automatically or manually. Since, with a horizontal lever 18, the support 10 is not hindered or precluded from a pendulum movement, the support 10 stands vertically or remains in this position. If now the extension 8 is unfolded and, accordingly, the lever 18 is pivoted downwardly, then the bulge 19 engages behind the crosspiece 15. In so doing, the support 10 is arrested and remains in the position illustrated in FIG. 2 also when the bridge plate 1 is pivoted. In this position of the support 10, the bridge plate 1 can also be introduced into the bridge recess 4, since the support 10 cannot engage upon its abutment 11.

It is important to note that danger can arise when the extension 8 is unfolded and the platform 6 or the like is intentionally or unintentionally withdrawn. If this occurs from the position according to FIG. 1, the extension 8 folds or flips downwardly. Already after a short pivoting path out of the position according to FIG. 1, the pull rod 17 moves to the rear. The support 10 is released and can then pivot almost immediately into the working or effective position (dot-dash line in FIG. 2) and, in particular, due to its dead weight. This reaction has as a consequence that the bridge plate 1 cannot dip, but rather must find its support at the level of the ramp upper side 5.

On the basis of the illustrated lever relationships or ratios, and with the play in the crosspiece 15, a downward pivoting of the extension 8 by approximately 10°–15° is sufficient to release the folding arresting means for the strut or support 10. The reaction speed of the support 10 can be increased by extending the pull rod 17 and by shortening the extension prolongation 14 (spacing of the engagement location of the bulge 19 from the pivot axis of the support 10 or from the shaft 13). Preferably, the pull rod 17 is also extended approximately at right angles in relation to the support 10 in the working or effective position of the extension 8. The lever ratio a:b (spacing in the aforementioned sense on the one hand, and effective length of the support 10), in this connection, should be approximately 1:7 to 1:4, whereby it is to be understood that larger lever differences lead to quicker reactions. The length of the lever 18 furthermore should be approximately 40–50% of the pull rod length, which in turn should be approximately 60–80% of the length b.

Also advantageous is that the pull rod 17 extends approximately horizontally when the extension 8 is folded downwardly. Consequently, no hindrance of the strut or support 10 can occur. The support accordingly can swing into the inclined position in relation to the bridge plate 1 with the upward pivoting of the bridge plate 1, or the support can maintain its vertical position.

A further, especially advantageous embodiment of the invention is shown in FIGS. 3 and 4. With this modified bridge, a spring is associated with the strut or support 10' for pivoting it into working or effective position; this spring is preferably embodied as a pressure or compression spring 20 which surrounds the draw or pull rod 17' but can suitably also be replaced by a tension spring. This spring increases the reaction speed of the support 10', for instance, in case of a sudden withdrawal of the platform 6. Immediately, or after a pivot path of approximately 5°–8° of the extension 8', the support 10' folds or flips into the vertical work or effective position to bring about support of the bridge. At the same time, this spring also has the advantage that it holds the support 10' in the position of FIG. 3.

The compression spring 20 is supported at the rear on a collar 21 of the pull rod 17'; at its front end, the spring 20 engages a traverse, bar or rod 22 in the form of a bolt rotatably journalled in a sleeve or bushing 23. The bolt 22 in turn has the draw bar 17' passing therethrough and at the rear end engages the bulge or widened portion 19'. Both sleeves or bushings 23, in this connection, are welded to the upper end of the support 10', and accordingly also form a part of the extension prolongation 14'. Just below the bushings or sleeves 23 is located an abutment 24 which is rigidly connected with the bridge plate 1'. On both sides of the support 10', the shafts 13' are arranged in bearings 25 which are secured to the bridge plate by bars 26.

Accordingly, the support 10' is held between the compression spring 20 and the bulge 19' in the operating position of the extension 8'. If the extension 8' tilts downwardly, there occurs a pivoting of the lever 18' by 90°, whereby the pull rod 17' reaches the dot-dash line position, and the vertical end position of the support 10' is fixed by engagement of the sleeves or bushings 23 upon the abutment 24. By folding or flipping up the extension 8', there is then again reached the illustrated position in which the strut or support is retracted or pivoted back.

Important for the function of the compression spring 20 is the preloading thereof already in the condition according to the drawing. If the lever 18' is pivoted slightly rearwardly, then the compression spring 20 is stressed still more, while the pull rod 17' passes still further through the rod 22. In so doing, however, the compression spring is relieved or less stressed, which can occur only by a pivoted movement of the support 10' in a direction to the working or effective position. The mentioned preloading also holds the support 10' by engagement or pressing of the extension prolongation 14' against the rod 22 in the condition according to the drawing.

To attain a good engagement of the support 10', the latter can have an inclined support surface 27 underneath. This support surface 27 engages upon a likewise inclined or angled-off surface 28 of the support or abutment 11'.

The strut or support 10' can also be profiled or shaped in such a way that during introduction of the bridge into the ramp recess 4', no hindrance exists from the abutment 11' when the position according to the drawing is occupied.

The present invention is, of course, in no way restricted to the specific disclosure of the specification and drawings, but also encompasses any modifications within the scope of the appended claims.

What I claim is:

1. A dock leveler for use with a ramp or dock having a ramp recess provided with an abutment support, said dock leveler comprising in combination:
   a bridge plate pivotally journalled at its rear end on said ramp about a horizontal axis;
   an extension pivotally connected to the front end of said bridge plate, said extension being pivoted downwardly in the rest position of said dock leveler, and being pivoted into the plane of said bridge plate in the working position of said dock leveler, said extension serving for exclusive support of said bridge plate upon a vehicle which is to be loaded or unloaded;
   a pendulum-like support having a pivot shaft for pivotally connecting it near the front end of said bridge plate, said support providing support for said bridge plate upon said abutment support when dock leveler is not being used, i.e., is in the rest position;
   a lever connected to said extension for pivoting therewith, said support maintaining a pivot position, for introducing said bridge plate into said ramp recess, by means of said lever, said support, in such pivot position being unable to correspond or align with said abutment support;
   an extension prolongation of said support located beyond said pivot shaft on that end of said support remote from said abutment support; and
   a pull rod pivotally connected to said lever, said pull rod engaging behind said extension prolongation whereby holding of said support by said pull rod exists until the pull rod releases said support by shifting of the pull rod in a direction toward the bridge rear end to increase reaction speed of said support during downward pivoting of said extension.

2. A dock leveler in combination to claim 1, in which said pull rod passes through said support and is provided with a widened portion at that end remote from said connection to said lever.

3. A dock leveler in combination according to claim 1, in which the ratio of the length of said extension prolongation to the length of said support (measured from that end of said support remote from said extension prolongation up to said pivot shaft) ranges approximately from 1:7 to 1:4.

4. A dock leveler in combination according to claim 1, in which said pull rod, in the working position of said dock leveler, is approximately at right angles to said support.

5. A dock leveler in combination according to claim 1, in which the length of said lever is approximately 40-50% of the length of said pull rod.

6. A dock leveler in combination according to claim 1, in which the length of said pull rod is approximately 60-80% of the length of said support.

7. A dock leveler in combination according to claim 1, in which said pull rod, in the rest position of said dock leveler, is substantially parallel to said bridge plate.

8. A dock leveler in combination according to claim 2, in which said support has a U-shaped configuration with two legs and a crosspiece interconnecting said legs, said pull rod passing through said crosspiece.

9. A dock leveler in combination according to claim 8, in which blocking of movement of said support is releasable by pivoting of said extension downwardly from the working position by approximately 10°-15°.

10. A dock leveler in combination according to claim 1, in which said support is a weight pendulum.

11. A dock leveler in combination according to claim 1, in which a spring is associated with said support for pivoting it into the working position.

12. A dock leveler in combination according to claim 11, in which said spring is preloaded.

13. A dock leveler in combination according to claim 11, in which said spring is a compression spring and surrounds said pull rod.

14. A dock leveler in combination according to claim 1, in which said extension prolongation is provided with a rod which extends transverse to said support, and pull rod passing through said rod.

15. A dock leveler in combination according to claim 1, which includes an abutment rigidly connected with said bridge plate, and in which said extension prolongation is a bushing and, in the working position of said support, engages against said abutment.

16. A dock leveler in combination according to claim 11, in which said pull rod includes a widened portion at that end thereof remote from said pivotal connection to said lever, said extension prolongation, in the rest position of said support, being held between said spring and said widened portion.

17. A dock leveler in combination according to claim 1, in which said support is profiled in such a way that during the introduction of said bridge plate into said ramp recess in the rest position of said support, said bridge plate encounters no hindrance from said abutment support.

18. A dock leveler in combination according to claim 14, in which said rod has a break-through (bore) corresponding to the diameter of said pull rod.

19. A dock leveler in combination according to claim 1, in which said support includes means for supporting it on both sides, said pull rod engaging against said support centrally between said support means.

* * * * *